(12) United States Patent
Aggarwal et al.

(10) Patent No.: US 12,386,829 B2
(45) Date of Patent: Aug. 12, 2025

(54) DATABASE RETRIEVAL AND REPORTING SYSTEM

(71) Applicant: People Center, Inc., San Francisco, CA (US)

(72) Inventors: Nikunj Aggarwal, Secaucus, NJ (US); Abhishek Gupta, Haryana (IN); Naman Kumar Agarwal, Bengaluru (IN); Ayush Rai, Madhya Pradesh (IN); Marco Nkemta Ndoping, Houston, TX (US); Rohit Sivakumar, Kitchener (CA); Nizar Mohammad Hejazi, Redmond, WA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/391,076

(22) Filed: Dec. 20, 2023

(65) Prior Publication Data
US 2025/0094419 A1    Mar. 20, 2025

(30) Foreign Application Priority Data
Sep. 15, 2023    (IN) .............................. 202311062251

(51) Int. Cl.
*G06F 16/00* (2019.01)
*G06F 16/2453* (2019.01)
*G06F 16/248* (2019.01)

(52) U.S. Cl.
CPC .. *G06F 16/24537* (2019.01); *G06F 16/24542* (2019.01); *G06F 16/248* (2019.01)

(58) Field of Classification Search
CPC ......... G06F 16/24537; G06F 16/24542; G06F 16/248
See application file for complete search history.

(56) References Cited

U.S. PATENT DOCUMENTS

| 8,244,714 B1 | 8/2012 | Collins et al. |
| 11,657,088 B1 * | 5/2023 | Acheson ........... G06F 16/90335 707/741 |

(Continued)

FOREIGN PATENT DOCUMENTS

| CN | 112199930 B * | 6/2024 | ......... G06F 16/2282 |

OTHER PUBLICATIONS

Madhav et al., "Inside Rippling's Real-Time Reporting Engine", Aug. 7, 2023, https://www.rippling.com/blog/ripplings-real-time-reporting-engine, retrieved on Dec. 18, 2023, 27 pages.

(Continued)

*Primary Examiner* — Dinku W Gebresenbet
(74) *Attorney, Agent, or Firm* — Dority & Manning, P.A.

(57) ABSTRACT

Systems, devices, computer-implemented methods, and tangible non-transitory computer readable media for implementing an organizational management platform that manages organizational data for an organization. The system can receive, from a user device, a user request for a report. Additionally, the system can generate a logic plan based on the user request, the logic plan determining a plurality of models. Moreover, the system can generate a first query being expressed in a custom query language. Furthermore, the system can combine the first query with a second query to generate a unified query. Subsequently, the system can translate the unified query into a final query, wherein the final query is expressed in a data access language. The system can execute the final query to retrieve data from a database, where a report is generated based on the retrieved data.

18 Claims, 7 Drawing Sheets

(56) References Cited

U.S. PATENT DOCUMENTS

2005/0039033 A1    2/2005  Meyers et al.
2019/0108260 A1*  4/2019  Zhitomirsky ..... G06F 16/24554
2021/0279043 A1*  9/2021  Egenolf ................ G06F 16/211
2023/0045347 A1*  2/2023  Grady ...................... G06N 5/02

OTHER PUBLICATIONS

Graefe G: "Query evaluation techniques for large databases", ARXIV.org, Cornell University Ithaca, NY 14853, vol. 25, No. 2, Jun. 1, 1993, pp. 73-170, XP002306867, DOI: 10.1145/152610.152611.
PCT App. No.: PCT/US2024/046664, International Search Report and Written Opinion, mailed Dec. 11, 2024, 18 pages.

* cited by examiner

DATABASE RETRIEVAL AND REPORTING SYSTEM

PRIORITY CLAIM

This application is based upon and claims the benefit of priority to Indian Provisional Patent Application No. 202311062251, filed on Sep. 15, 2023. The present application claims priority to, benefit of, and incorporates by reference the entirety of the contents of the cited application.

FIELD

The present disclosure generally relates to computer systems. More particularly, the present disclosure relates to optimizing data retrieval from a database to generate reports.

BACKGROUND

A computer program is a collection of instructions that can be executed by a computer device to perform one or more tasks. Computer programs usually are written by a computer programmer (i.e., software developer, programmer, coder, etc.) having specialized knowledge of one or more highly complex computer programming languages (e.g., Java, C, C++).

Most users lack the specialized knowledge, experience, and skills needed to write computer programs in a programming language. This usually prevents most non-programmers from developing and performing their own custom operations associated with organizational data and other types of information stored in computer systems. As such, most users generally are restricted to the applications and interfaces provided by computer programs written by computer programmers. Therefore, a need exists for providing tools that empower users with the ability to access, query, obtain, and/or perform other operations with organizational data and other types of information available in computer systems.

SUMMARY

Aspects and advantages of embodiments of the present disclosure will be set forth in part in the following description, or can be learned from the description, or can be learned through practice of the embodiments.

One example aspect of the present disclosure is directed to a computer system that implements an organizational management platform that manages organizational data for an organization. The computer system can include one or more databases that collectively store the organizational data associated with the organization. The organizational data can include an object graph data structure having a plurality of employee data objects that respectively correspond to a plurality of employees of the organization. The computer system can include one or more non-transitory computer-readable media that collectively store instructions that, when executed by the one or more processors, cause the computer system to perform operations. The operations can include receiving, from a user device, a user request for a report. Additionally, the operations can include generating a logic plan based on the user request. The logic plan can determine a plurality of models. Moreover, the operations can include generating a first query being expressed in a custom query language. The first query can be for a join operation. Furthermore, the operations can include combining the first query with a second query to generate a unified query. The second query can be for a filter operation. The unified query can be expressed in the custom query language. Subsequently, the operations can include translating the unified query into a final query and executing the final query to retrieve data from a database. The final query can be expressed in a data access language. A report can be generated based on the retrieved data.

In some instances, the operations further include aggregating the unified query from a first database from the plurality of databases with a new query from a second database from the plurality of databases to generate an aggregated query. Additionally, the final query can be further generated based on the aggregated query.

In some instances, the aggregated query can perform an aggregation on one-to-many joined datasets.

In some instances, the operations further include serializing the unified query to generate a serialized query. Additionally, the final query is further generated based on the serialized query.

In some instances, the data access language is Structured query language (SQL).

In some instances, the operations further include loading data from a first database in the plurality of databases based on the user request. Additionally, the operations can include loading data from a second database in the plurality of databases based on the user request. Moreover, the operations can include generating permission filters for the first database in the plurality of databases based on user privileges of the user device.

In some instances, the logic plan can be associated with a plurality of models. Additionally, the operations can include loading a query generator for the plurality of models.

Another example aspect of the present disclosure is directed to a computer-implemented method for managing organizational data of an organization. The method can include receiving, from a user device, a user request for a report. Additionally, the method can include generating a logic plan based on the user request. The logic plan can determine a plurality of databases to obtain data for the report. Moreover, the method can include generating, based on the logic plan, a join query being expressed in a custom query language. The first query can be for a join operation. Moreover, the method can include combining the first query with a second query to generate a unified query that is being expressed in the custom query language. The second query can be for a filter operation. Furthermore, the method can include generating, based on the first query, a final query, wherein the final query is expressed in a data access language. Subsequently, the method can include executing the final query to retrieve data from a database, wherein a report is generated based on the retrieved data.

In some instances, the method can include aggregating the unified query from a first database from the plurality of databases with a new query from a second database from the plurality of databases to generate an aggregated query, wherein the final query is further generated based on the aggregated query.

In some instances, the aggregated query performs an aggregation on one-to-many joined datasets.

In some instances, the method can include serializing the unified query to generate a serialized query, wherein the final query is further generated based on the serialized query.

In some instances, the data access language is Structured query language (SQL).

In some instances, the method can include loading data from a first database in the plurality of databases based on the user request. Additionally, the method can include loading data from a second database in the plurality of the database based on the user request. Moreover, the method can include generating permission filters for the first database in the plurality of databases based on user privileges of the user device.

In some instances, the logic plan can be associated with a plurality of models, and the method can include loading a query generator for the plurality of models.

Another example aspect of the present disclosure is directed to one or more tangible non-transitory computer-readable media storing computer-readable instructions that, when executed by one or more processors, cause the one or more processors to perform operations. The operations can include receiving, from a user device, a user request for a report. Additionally, the operations can include generating a logic plan based on the user request. The logic plan can determine a plurality of models. Moreover, the operations can include generating a first query being expressed in a custom query language. The first query can be for a join operation. Furthermore, the operations can include combining the first query with a second query to generate a unified query. The second query can be for a filter operation. The unified query can be expressed in the custom query language. Subsequently, the operations can include translating the unified query into a final query and executing the final query to retrieve data from a database. The final query can be expressed in a data access language. A report can be generated based on the retrieved data.

Other aspects of the present disclosure are directed to various systems, apparatuses, non-transitory computer-readable media, user interfaces, and devices for providing multilayered generation and processing of computer instructions. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
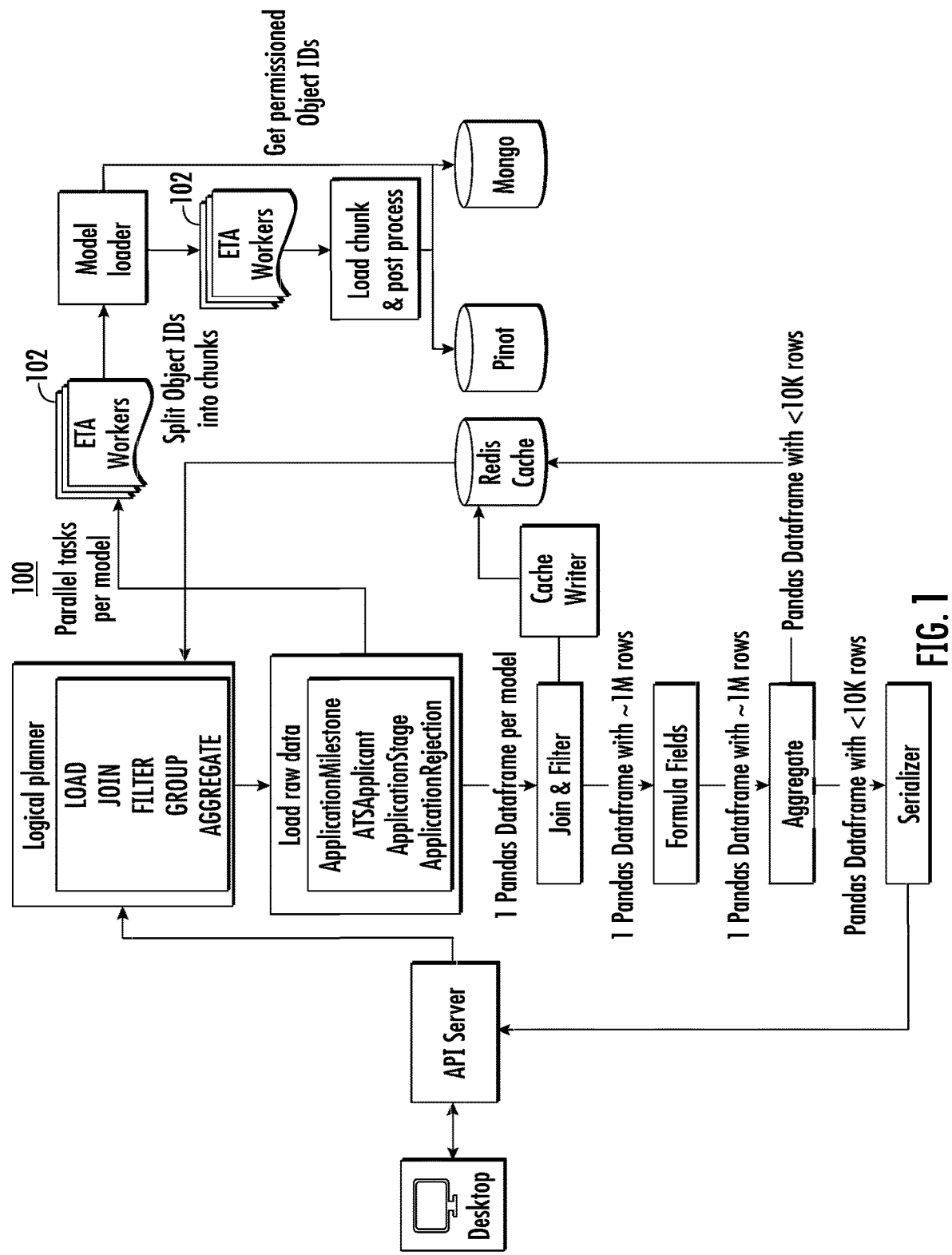
FIG. 1 depicts a diagram of a conventional architecture of a computing system, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

Generally, the present disclosure is directed to providing improved computer applications, computer systems, computer-implemented methods, user interfaces, and/or services for automated report generation using custom computer language and optimized data retrieval techniques. For example, the system allows users to query, interact with, and/or perform various tasks associated with organizational data stored in an organizational data management system.

The system described herein can utilize an analytics engine that is tuned to support real time queries. In some instances, as large customers are onboarded on an organization data management system, the volume of organization data can grow exponentially, which may result in delays in data retrieval or automatic report generation. For example, the system may encounter issues with tail latencies, which can be amplified as the system generates a plurality of reports on a unified dashboard for a user.

According to some embodiments, the system utilizes a novel architecture that can support reporting millions of data points in seconds, which can optimize reports generation with growing data and also reduce tail latencies.

For example, the system, using custom query language, can generate a job listing report titled "candidates by stage with rejection count." This custom job listing report can provide the number of candidates per stage with a rejection count. The system can generate the report by generating a report configuration file that can be sent to a backend application programming interface (API). An example of the configuration file is shown below:

```
{
    "selectedAttributeIds": [
        "ATSApplicant:candidateV2.name.full",
        "ATSApplicant:currentStageName",
        "ATSApplicant:appliedAt",
        "ApplicantRejection:rejectionReason"
    ],
    "dateFilterAttributeIds": [
        "ATSApplicant:appliedAt"
    ],
    "groupByConfigs": [
        {
            "attributeId": "ATSApplicant:currentStageName",
            "groupingDepth": 0,
            "bucketByConfigs": [ ]
        }
    ],
    "aggregationFunction": "COUNT",
    "reportDatePeriod": {
        "filter_type": "ALL_TIME"
    },
```

-continued

```
"aggregationConfigs": [
    {
        "id": "ATSApplicant:appliedAt",
        "aggregationFunction": "MAX"
    },
    {
        "id": "ATSApplicant:count",
        "aggregationFunction": "COUNT"
    },
    {
        "id": "ApplicantRejection:count",
        "aggregationFunction": "COUNT"
    }
],
}
```

Continuing with this example, the report can be generated by querying a plurality of models. In this example, the report is generated by querying three models (i.e., ATSApplicant, ApplicationStage and ApplicationRejection). The system can generate the report by performing operations across a plurality of models. For example, to get a sense of scale, when a customer creates a report with three tables with an intermediate dataset reaching close to one million rows for a large company, the system may need to handle more than one million intermediate data points within five seconds.

The systems, methods, and computer program products described herein provide a number of technical effects and benefits. As one example, the embodiments described in the present disclosure provide automated generation and processing of computer instructions for use across a variety of applications and systems that utilize different underlying technologies and technical designs, for example, more efficiently and with fewer computing resources (e.g., less processing power, less memory usage, less power consumption, etc.), that would otherwise be wasted by maintaining custom, proprietary, and/or manual processes. In particular, examples of the present disclosure automate the generation and processing of computer instructions across different applications and systems using a rigorous computerized process.

Additionally, the techniques described herein reduce the network bandwidth requirement to generate a report. For example, by combining the different queries into a unified query, the system can retrieve data from one or more databases during a single operation, in contrast to conventional systems when the data is retrieved for each query and then manipulated to generate the report. As a result, the amount of data retrieved in a conventional system for generating the same report can be much larger than with the system described herein. For example, with the novel architecture described herein, by increasing the number of SQL operations that are aggregated and unified, it reduces the amount of raw data that needs to be serialized and transferred between the SQL query engine and the OLAP engine, resulting in a more efficient query.

With reference to the Figures, example embodiments of the present disclosure will be discussed in further detail.

In conventional architecture 100 as illustrated in FIG. 1, the reporting engine can rely on a parallel processing framework to load raw data in chunks from a database (e.g., MongoDb, Pinot). Once data is loaded in memory, the system can perform fast in-memory transformations. Additionally, the system can extensively cache intermediate datasets in memory for future requests. However, with growing data, bottlenecks can occur in the conventional architecture 100, such as deserializing all tables from ETA workers 102 into memory (i.e., load raw data operation).

Moreover, during report generation, the system may need to serialize the data if the system maintains a cache at an intermediate layer. Serializing the data can become another bottleneck as the amount of data grows.

Furthermore, the bottleneck can result in tail latencies. For example, as the usage of reporting engines increases, spawning ETA workers 102 without delays can become a bottleneck, which may cause tail latencies. Tail latencies can result in a poor user experience. Therefore, improvement to the system architecture, as described herein, can reduce tail latencies.

Figure 2:
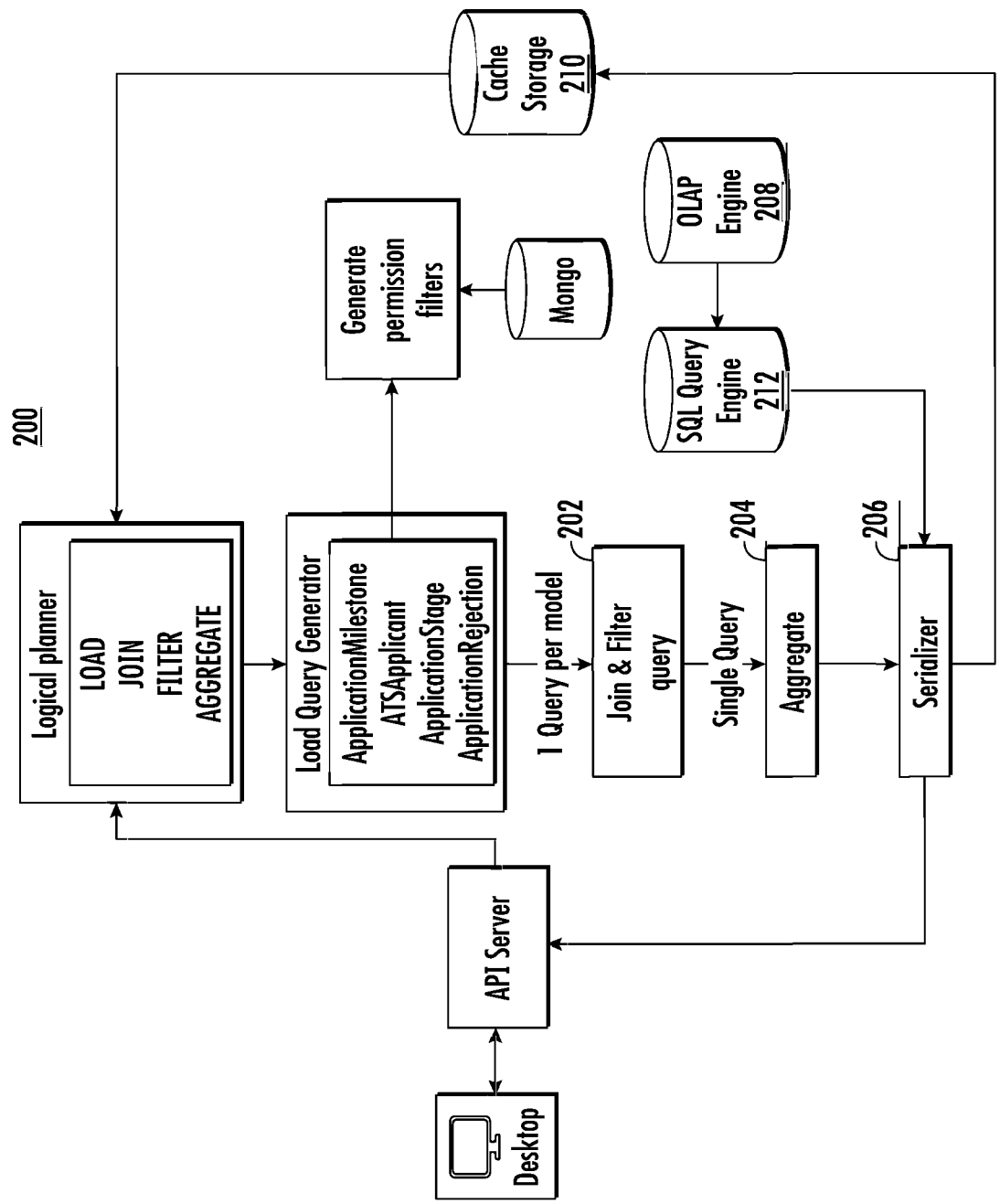
FIG. 2 depicts a diagram of a novel architecture of a computing system, according to example embodiments of the present disclosure.

According to some embodiments, the system can be implemented with a novel architecture 200 as illustrated in FIG. 2. The novel architecture can address the bottleneck of serializing and deserializing data across multiple layers. The system can adopt the novel architecture 200 to push all our computations closer to the database. In the novel architecture, each operation (e.g., load, join, filter, aggregate, serialize) creates a query (e.g., SQL query) to be executed by a distributed query engine. Additionally, the system can add the subsequent query to the query of the previous operation. For example, the join and filter query 202 can be added to the aggregate query 204, when then can be added to the serialize operation 206. Subsequently, the serialize operation 206 can request for the data to be evaluated which is done by executing the unified query on the distributed query engine.

The distributed query engine executes the query by pushing some of the operations down to the online analytical processing (OLAP) engine 208, while doing others in its own memory. Eventually, the serializer gets back the final filtered dataset after all operations are applied. An example of an OLAP engine 208 can be a Pinot engine. OLAP is an approach to answer multi-dimensional analytical (MDA) queries swiftly in computing.

In some instances, the final version of the data can be cached in cache storage 210 to reduce the load on the OLAP engine 208 and SQL query engine 212 for duplicate queries. An example of cache storage can be Redis. The final dataset can be much smaller than intermediate datasets the system retrieved in the conventional architecture, therefore the serialize and/or deserialize effect is minimal.

Figure 3:
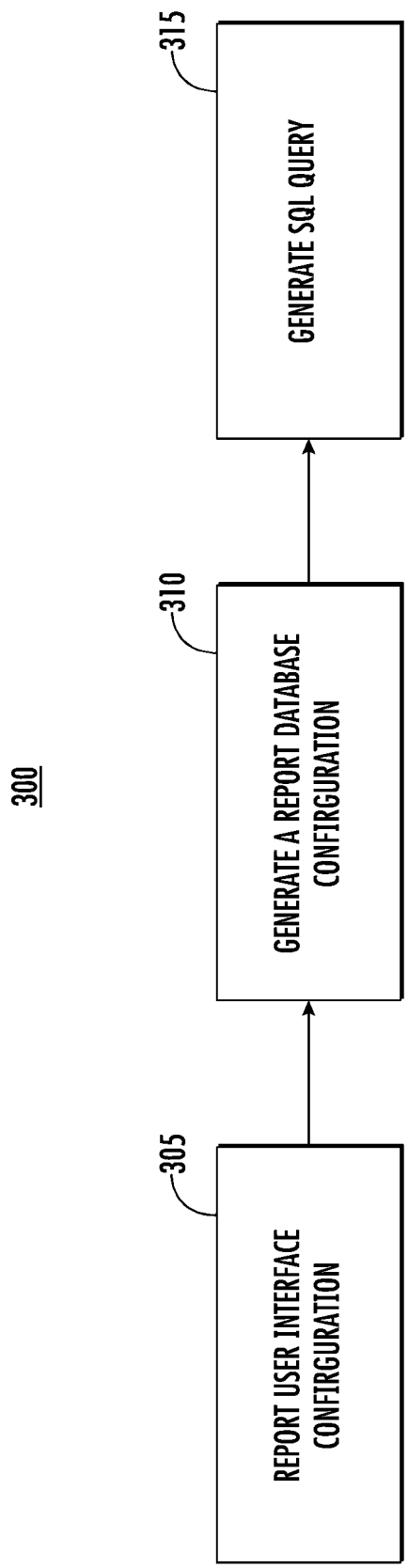
FIG. 3 depicts a high-level flow diagram of generating a database query, according to example embodiments of the present disclosure.
Figure 4:
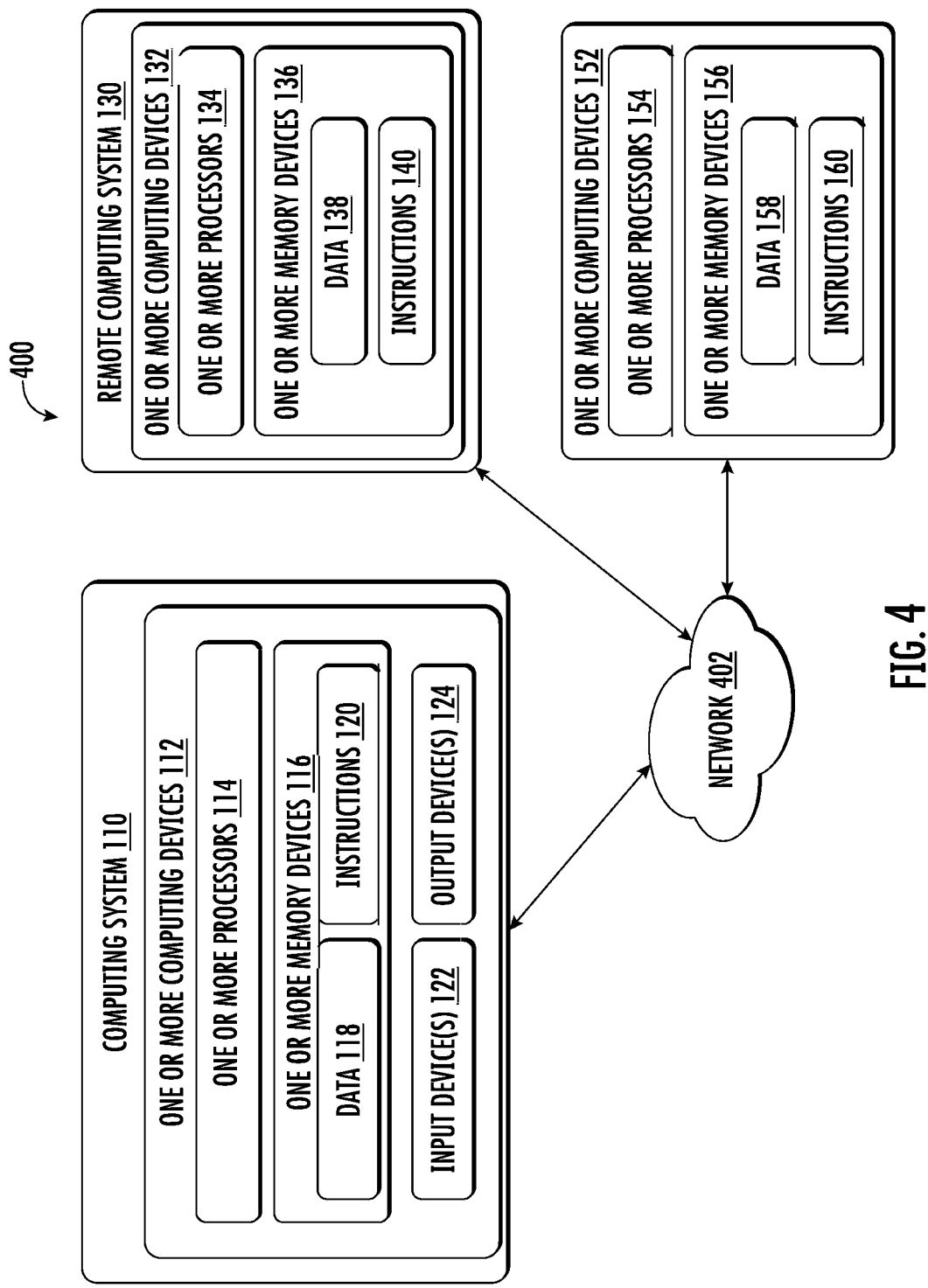
FIG. 4 depicts a block diagram of an example of a computing device, according to example embodiments of the present disclosure.

FIG. 3 illustrates an example flow diagram 300 according to some embodiments of the present invention. As illustrated in FIG. 4, the system can perform a configuration transformation. At 305, the system can report user interface configuration. This can be the payload sent by the Reports UI to the API. This operation directly correlates to user input with some additional metadata.

At 310, the system can perform a report dataset configuration. For example, the system can generate an intermediate representation of the ReportsPayload, to work with the domain specific query language. The system can create the ReportsDataset Configuration, as shown below, which can be translated to SQL.

An example of the structure of the ReportsDatasetConfig is shown below:

```
ReportsDataset
|
|-----> from_clause(ReportsDatasetFrom)
|
|-----> groupable_columns(ReportsDatasetColumnsList)
|    |
```

```
|     |-----> ReportsDatasetColumn
|     |
|     |-----> ReportsDatasetCalculatedAttributeColumn
|           |
|           |-----> CalculatedAttributeInfo
|-----> aggregated_columns(ReportsDatasetColumnsList)
|
|-----> join_condition(ReportsDatasetJoinCondition)
```

```
|
|-----> where_filters(ReportsDatasetWhereFilters)
    |
    |-----> ReportsDatasetFilter
```

In another example, below is the structure of the ReportsDatasetConfig for generating a report to get new hires per year:

```
REPORTSDATASET(
  FROM(
    REPORTSDATASET(
      FROM(
        RoleWithCompany as dataset_RoleWithCompany
      ),
      JOINCONDITION(
      ),
      GROUPABLE_COLUMNS(
        YEAR(dataset_RoleWithCompany.startDate) as RoleWithCompany_startDate,
dataset_RoleWithCompany.id as RoleWithCompany_id
      ),
      AGGREGATED_COLUMNS(
      ),
      WHERE_FILTERS( )) as dataset_RoleWithCompany
  ),
  JOINCONDITION(
  ),
  GROUPABLE_COLUMNS(
    dataset_RoleWithCompany.RoleWithCompany_startDate as RoleWithCompany_startDate
  ) WITH_ROLLUP,
  AGGREGATED_COLUMNS(
    COUNTDISTINCT(dataset_RoleWithCompany.RoleWithCompany_id) as
RoleWithCompany_id
  ),
  WHERE_FILTERS( ),
  ORDERBY (COUNT(IF(ISNULL(dataset_RoleWithCompany.RoleWithCompany_startDate), 1, 1))
DESC)
)
```

Subsequently, at 315, the system can generate an SQL query. For example, an SQL generation can be performed. In some instances, the system can integrate the ReportsDataset query with custom computer programming. Additionally, the system can convert the generated query to SQL with applying permissions and company filter, as shown below.

```
SELECT
  "tbl1_1"."RoleWithCompany_startDate" AS "RoleWithCompany_startDate",
  COUNT(DISTINCT("tbl1_1"."RoleWithCompany_id")) AS "RoleWithCompany_id"
FROM
  (
    SELECT
      YEAR(DATE("tbl2_1"."startDate")) AS "RoleWithCompany_startDate",
      "tbl2_1"."observable_cache_fullName" AS "RoleWithCompany_fullName",
      "tbl2_1"."id" AS "RoleWithCompany_id"
    FROM
      "role_with_company00004" "tbl2_1"
    WHERE
      "tbl2_1"."company" = '583fd880f51633c21d7e0916'
      AND "tbl2_1"."isDeleted" = false
  ) "tbl1_1"
GROUP BY
  ROLLUP("tbl1_1"."RoleWithCompany_startDate")
ORDER BY
  COUNT(IF("tbl1_1"."RoleWithCompany_startDate" IS NULL, 1, 1)) DESC;
```

With regards to SQL query engine execution, the converted query can be executed on an SQL query engine. The system can modify the data to the required format required by the frontend for rendering. With the novel architecture, the higher the number of SQL operations that are pushed to the OLAP engine 208, the less raw data needs to be serialized and transferred between the SQL query engine 212 and the OLAP engine 208, resulting in a more efficient query.

With regards to database filters to SQL filters for permissions, the conventional techniques may not be scalable for large datasets. In the conventional architecture 100, the permissions evaluator used to execute a database query to return a list of permissioned object identifiers (IDs) for the logged in user and then the data fetcher can split these IDs in chunks to fetch the data in parallel from the database.

In the novel architecture 200, the system re-implemented the permissions evaluator to automatically translate the database permissions query to a SQL query filter and append it to the data fetcher query.

For example, here is a permission database query and the translated SQL filter.

Database (e.g., Mongo) Query:

Q(company='c1', owner='o1', appliedAt___gte=datetime.datetime(2023, 2, 14, 0, 0), jobReq___in=['j1'], id___nin=['id1'])

Translated SQL Query Filter:

company = 'c1' AND owner = 'o1' AND appliedAt >= DATE(2023, 2, 14) AND jobReq IN [ 'j1'] AND id NOT_IN [ 'id1' ]

FIG. 4 depicts a block diagram of an example environment 400 including a computing system 410 that performs operations according to example embodiments of the present disclosure. The environment 400 includes a network 402, a computing system 410, one or more computing devices 412, one or more processors 414, one or more memory devices 416, data 418, instructions 420, a remote computing system 430, one or more computing devices 432, one or more processors 434, one or more memory devices 436, data 438, instructions 440, one or more computing devices 452, one or more processors 454, one or more memory devices 456, data 458, and instructions 460.

The network 402 can include any type of communications network. For example, the network 402 can include a local area network (LAN), a wide area network (WAN), an intranet, an extranet, and/or the internet. Further, the network 402 can include any number of wired or wireless connections and/or links that can be used to communicate with one or more computing systems (e.g., the computing system 410 and/or the remote computing system 430) and/or one or more devices (e.g., the one or more computing devices 452). Communication over the network 402 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 410 can include any combination of systems and/or devices including one or more computing systems (not shown) and/or one or more computing devices 412. Further, the computing system 410 may be connected (e.g., networked) to one or more computing systems (e.g., remote computing system 430) and/or one or more computing devices (e.g., one or more computing devices 432, 452) via the network 402. The computing system 410 may operate in various different configurations including as a server or a client machine in a client-server network environment, or as a peer machine in a peer-to-peer (or distributed) network environment. Though the computing system 410 is depicted in FIG. 4 as a single device, the computing system 410 can include any collection or combination of devices that individually or in combination with other devices, execute a set of one or more instructions to perform any one or more of the operations discussed herein.

In this example, the computing system 410 includes the one or more computing devices 412. The one or more computing devices 412 can include any type of computing device. For example, the one or more computing devices 412 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 410 or any of the constituent components and/or devices of the computing system 410.

Any of the one or more computing devices 412 can include the one or more processors 414. The one or more processors 414 can include any processing device (e.g., a processor core, a microprocessor, an ASIC, a FPGA, a controller, or a microcontroller) and can include one processor or multiple processors that may be operatively connected. In some embodiments, the one or more processors 414 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 412 can include the one or more memory devices 416. The one or more memory devices 416 can be used to store data and/or information and can include one or more computer-readable media, one or more non-transitory computer-readable storage media, and/or one or more machine-readable media. Though the one or more memory devices 416 are depicted in FIG. 4 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 416 can include any combination of random-access memory (RAM), read-only memory (ROM), EEPROM, EPROM, one or more flash memory devices, and/or one or more magnetic storage devices (e.g., one or more hard disk drives).

The one or more processors 414 can be configured to execute one or more instructions to perform the operations described herein including, for example, one or more operations associated with performing multilayered generation and processing of computer instructions in association with a custom query language (e.g., a custom query language for use with organizational data) across various types of applications and/or computer systems. Further, the one or more memory devices 416 can store the data 418 and/or the instructions 420, which can be executed by the one or more processors 414 to cause the one or more computing devices 412 to perform one or more operations. For example, the one or more operations performed by the one or more processors 414 can include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more generated instructions in the second computing language, and providing the result in response to the request comprising the one or more instructions in the first computer language, etc.

The data 418 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or more policies associated with the organizational data, the rule data, the application data, one or more applications, one or more devices, etc.), data that includes instructions in a custom computer language (e.g., a custom query language based on organizational data), data that includes rules associated with the custom computer language, and/or other types of data. Further, the instructions 420 can include one or more instructions to use data including the data 418 to perform any one or more of the various operations described herein. In some embodiments, the one or more memory devices 416 can be used to store one or more applications that can be operated by the one or more processors 414. The data 418, the instructions 420, and/or the one or more applications can be associated with an organization. Further, the computing system 410 may be associated with an organization and may be configured to manage the one or more applications. For example, the computing system 410 can perform one or more operations associated with authenticating one or more users that attempt to access the one or more applications which can include one or more third-party applications, which may be remote from the computing system 410.

Any of the one or more computing devices 412 can include one or more input devices 422 and/or one or more output devices 424. The one or more input devices 422 can be configured to receive input (e.g., user input) and can include one or more touch screens, one or more keyboards, one or more pointing devices, (e.g., mouse device), one or more buttons, one or more microphones, and/or one or more cameras. The one or more output devices 424 can include one or more display devices, one or more loudspeaker devices, one or more haptic output devices. By way of example, the one or more output devices 424 can be used to display a graphical user interface via a display device that can include a touch screen layer that is configured to detect one or more inputs (e.g., one or more user inputs). The one or more processors 414 may perform one or more operations (e.g., operations associated with performing multilayered generation and processing of computer instructions) based at least in part on the one or more inputs.

The remote computing system 430 includes the one or more computing devices 432. Each of the one or more computing devices 432 can include one or more processors 434, one or more memory devices 436, the data 438, and/or the instructions 440. The remote computing system 430 can include any of the attributes and/or capabilities of the computing system 410. Further, the remote computing system 430 can communicate with one or more devices and/or one or more systems via the network 402.

In some embodiments, the remote computing system 430 can include one or more applications (e.g., computer software applications comprising computer instructions) that can be stored and/or executed by the remote computing system 430. Further, the one or more applications can include one or more third-party applications that may be accessed from the computing system 410 and which are at least partly operated from the remote computing system 430. The one or more third-party applications generally may be associated with and provided by an organization that is different from the organization that is associated with the computing system 410. Further, the data 438 can include one or more portions of the organizational data (e.g., one or more organizational records), one or more data structures associated with the organizational data, rule data, organizational policy data, application policy data, third-party integration data, and/or other types of data.

One or more computing devices 452 (e.g., user devices or any other types of devices) can include one or more processors 454, one or more memory devices 456, the data 458, and/or the instructions 460. Such one or more computing devices 452 may include any of the attributes and/or capabilities of the one or more computing devices 412, 432. Further, such one or more computing devices 452 can communicate with one or more devices and/or one or more systems via the network 402.

In some embodiments, the one or more computing devices 452 can include one or more applications (e.g., computer software applications comprising computer instructions) that can be stored and/or executed by such one or more computing devices 452. Further, the one or more applications can include one or more third-party applications that may be accessed from the one or more computing devices 452 and which are at least partly operated from such one or more computing devices 452. Data 438 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 5:
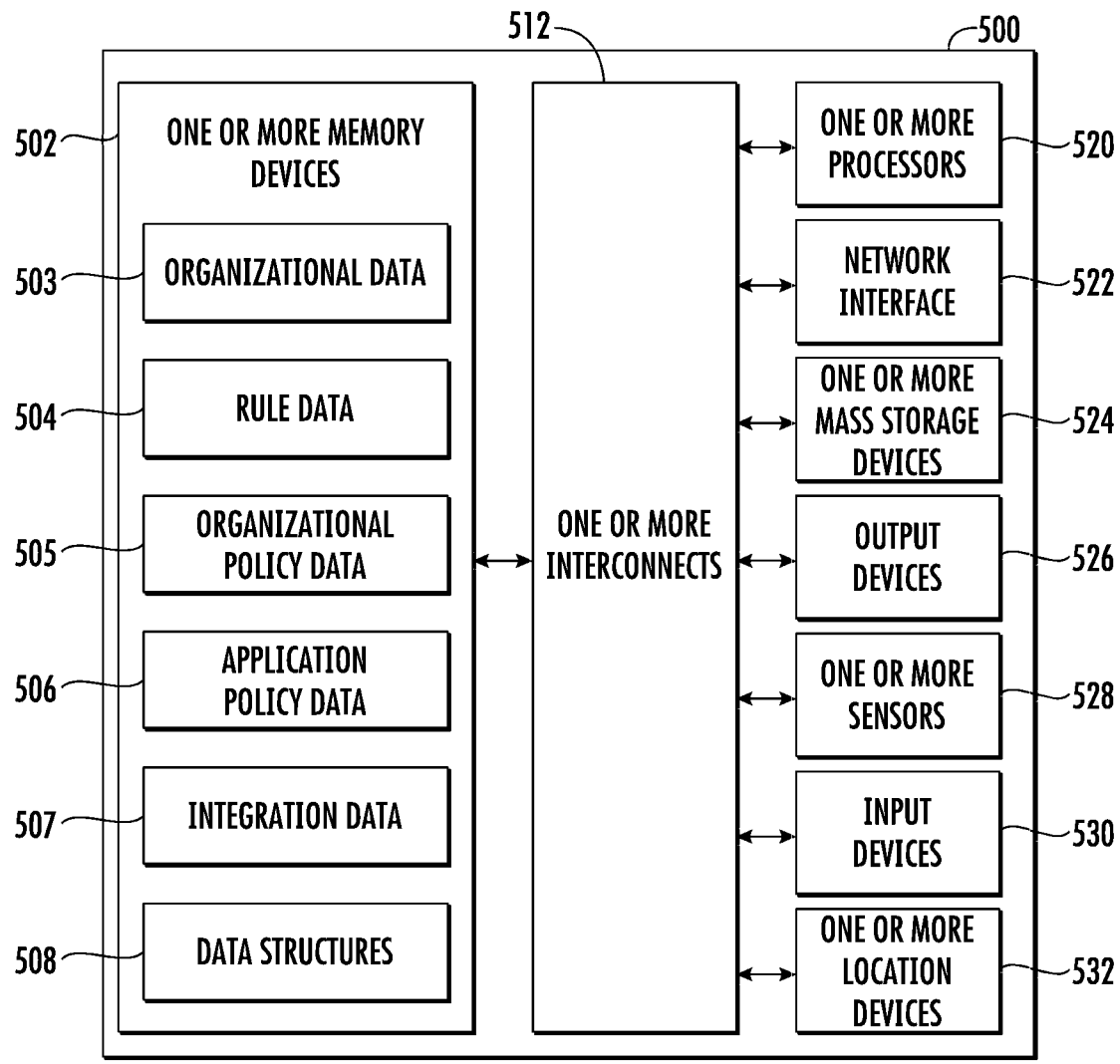
FIG. 5 depicts a block diagram of an example of a computing device, according to example embodiments of the present disclosure.

FIG. 5 depicts a block diagram of an example computing device 500 according to example embodiments of the present disclosure. The computing device 500 can include one or more attributes and/or capabilities of the computing system 410, the remote computing system 430, the one or more computing devices 452, and/or the computing device 500. Furthermore, the computing device 500 can be configured to perform one or more operations and/or one or more actions that can be performed by the computing system 410, the remote computing system 430, the one or more computing devices 452, and/or the computing device 500.

As shown in FIG. 5, the computing device 500 can include one or more memory devices 502, organizational data 503, rule data 504, organizational policy data 505, application policy data 506, integration data 507, data structures 508, one or more interconnects 512, one or more processors 520, a network interface 522, one or more mass storage devices 524, one or more output devices 526, one or more sensors 528, one or more input devices 530, and/or one or more location devices 532.

The one or more memory devices 502 can store information and/or data (e.g., organizational data 503, rule data 504, organizational policy data 505, application policy data 506, integration data 507, data structures 508, and/or any other types of data). Further, the one or more memory devices 502 can include one or more non-transitory computer-readable storage media, including RAM, ROM, EEPROM, EPROM, flash memory devices, magnetic disks, and any combination thereof. The information and/or data stored by the one or more memory devices 502 can be executed by the one or more processors 520 to cause the computing device 500 to perform one or more operations associated with performing multilayered generation and processing of computer instructions (e.g., in association with computer instructions in a custom query language) across various types of applications and/or computer systems, including, for example, receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more instructions in the second computing language, and providing the result in response to the request comprising the one or more instructions in the first computer language.

The organizational data 503 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored respectively in any of the one or more memory devices 416, 436, 456. The organizational data 503 also can include information associated with one or more applications (e.g., one or more third-party applications), one or more organizational records and/or one or more organizational policies. In some embodiments, the organizational data 503 can be received from one or more computing systems (e.g., the remote computing system 430 depicted in FIG. 4) which can include one or more computing systems that are remote (e.g., in another room, building, part of town, city, or nation) from the computing device 500.

The rule data 504 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored in the one or more memory devices 416, the one or more memory devices 436, and/or the one or more memory devices 456, respectively. The rule data 504 can include information associated with one or more rules that can be used to generate and/or implement an application policy. The rule data 504 also can include information associated with one or more rules of an organizational data management system (e.g., base or default rules provided or enforced by the system, one or more custom rules configured by an organization, etc.). The rule data 504 also can include one or more rules associated with implementing and/or utilizing a custom computer language, such as a custom computer language for performing operations associated with organizational data 503. In some embodiments, the rule data 504 can be received from one or more computing systems (e.g., the remote computing system 430 depicted in FIG. 4), which can include one or more computing systems that are remote from the computing device 500.

The organizational policy data 505 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored in the one or more memory devices 416, the one or more memory devices 436, and/or the one or more memory devices 456, respectively. Furthermore, the organizational policy data 505 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 505 can be received from one or more computing systems (e.g., the remote computing system 430 depicted in FIG. 4) which can include one or more computing systems that are remote from the computing device 500.

The application policy data 506 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored in the one or more memory devices 416, the one or more memory devices 436, and/or the one or more memory devices 456, respectively. Furthermore, the application policy data 506 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 506 can be received from one or more computing systems (e.g., the remote computing system 430 depicted in FIG. 4) which can include one or more computing systems that are remote from the computing device 500.

The integration data 507 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored in the one or more memory devices 416, the one or more memory devices 436, and/or the one or more memory devices 456, respectively. The integration data 507 can include configuration and/or operational information associated with integrating and synchronizing data (e.g., organizational data 503) among one or more applications. For example, the integration data 507 can include information that enables integration and synchronization between each of one or more applications (e.g., third-party applications and/or other applications). In an embodiment, the integration data 507 provides integration information that allows an organizational data management system (e.g., a system of record for organizational data and organizational data processing), for example, to obtain information from one or more applications (e.g., third party and/or other applications), to perform operations involving organizational data (e.g., organizational data 503) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 507 can be received from one or more computing systems (e.g., the remote computing system 430 depicted in FIG. 4), which can include one or more computing systems that are remote from the computing device 500.

The data structures 508 can include one or more portions of data (e.g., the data 418, the data 438, and/or the data 458, which are depicted in FIG. 4) and/or instructions (e.g., the instructions 420, the instructions 440, and/or the instructions 460, which are depicted in FIG. 4) that are stored in the one or more memory devices 416, the one or more memory devices 436, and/or the one or more memory devices 456, respectively. The data structures 508 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 508 can be implemented and utilized with one or more types of computer software, computer hardware, or any combination thereof. In an embodiment, the data structures 508 are used to represent and perform processing associated with various types of organizational data (e.g., organizational data 503). For example, the data structures 508 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data (e.g., organizational data 503).

The data structures 508 also can define various relationships among the various entities associated with organizational data. For example, the data structures 508 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 503 based on one or more organizational data management applications).

In some embodiments, the data structures 508 can include one or more object graphs providing information about entities, relationships, and/or any other aspects relating to the definition, structure, and rules associated with organizational data (e.g., organizational data 503). The data structures 508 also can include any one or more other types of data structures (e.g., with or without the use of object graphs) that provide information about entities, relationships, and/or any other aspects of the definition, structure, and/or rules associated with organizational data. In some embodiments, the data structures 508 can be received from one or more computing systems (e.g., the remote computing system 430 depicted in FIG. 4), which can include one or more computing systems that are remote from the computing device 500.

The one or more interconnects 512 can include one or more interconnects or buses that can be used to send and/or receive one or more signals (e.g., electronic signals) and/or data (e.g., organizational data 503, rule data 504, organizational policy data 505, application policy data 506, integration data 507, data structures 508, and/or any other data) between components of the computing device 500, including the one or more memory devices 502, the one or more processors 520, the network interface 522, the one or more mass storage devices 524, the one or more output devices 526, the one or more sensors 528 (e.g., a sensor array), the one or more input devices 530, and/or the one or more location devices 532. The one or more interconnects 512 can be arranged or configured in different ways. For example, the one or more interconnects 512 can be configured as parallel or serial connections. Further the one or more interconnects 512 can include one or more internal buses that are used to connect the internal components of the computing device 500 and one or more external buses used to connect the internal components of the computing device 500 to one or more external devices. By way of example, the one or more interconnects 512 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 520 can include one or more computer processors that are configured to execute the one or more instructions stored in the one or more memory devices 502. For example, the one or more processors 520 can, for example, include one or more general purpose central processing units (CPUs), application specific integrated circuits (ASICs), and/or one or more graphics processing units (GPUs). Further, the one or more processors 520 can perform one or more actions and/or operations including one or more actions and/or operations associated with the organizational data 503, the rule data 504, the organizational policy data 505, the application policy data 506, the integration data 507, the data structures 508, and/or any other data. The one or more processors 520 can include single or multiple core devices including a microprocessor, microcontroller, integrated circuit, and/or a logic device.

The network interface 522 can support network communications. The network interface 522 can support communication via networks including a local area network and/or a wide area network (e.g., the internet). For example, the network interface 522 can allow the computing device 500 to communicate with the computing system 410 via the network 402.

The one or more mass storage devices 524 (e.g., a hard disk drive and/or a solid-state drive) can be used to store data including the organizational data 503, the rule data 504, the organizational policy data 505, the application policy data 506, the integration data 507, the data structures 508, and/or any other data. The one or more output devices 526 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 528 can be configured to detect various states and can include one or more cameras, one or more light detection and ranging (LiDAR) devices, one or more sonar devices, and/or one or more radar devices. Further, the one or more sensors 528 can be used to provide input (e.g., an image of a user captured using the one or more cameras) that can be used as part of invoking or performing one or more operations. For example, the one or more sensors 528 can be used to authenticate the identity of a user and determine an authorization level based on an image of the user's face that is captured using the one or more sensors 528.

The one or more input devices 530 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 500).

Although the one or more memory devices 502 and the one or more mass storage devices 524 are depicted separately in FIG. 5, the one or more memory devices 502 and the one or more mass storage devices 524 can be regions within the same memory module. The computing device 500 can include one or more additional processors, memory devices, and/or network interfaces, which may be provided separately or on the same chip or board. The one or more memory devices 502 and the one or more mass storage devices 524 can include one or more computer-readable media, including, but not limited to, non-transitory computer-readable media, RAM, ROM, hard drives, flash drives, and/or other memory devices.

The one or more memory devices 502 can store sets of instructions for applications including an operating system that can be associated with various software applications or data. For example, the one or more memory devices 502 can store sets of instructions for one or more applications (e.g., one or more organizational applications and/or one or more third-party applications) that are subject to one or more application policies or utilize third-party integration data that can be configured, generated, and/or implemented by the computing device 500 and/or one or more other computing devices or one or more computing systems. In some embodiments, the one or more memory devices 502 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 500 can include applications associated with the computing system 410, the remote computing system 430, and/or the one or more computing devices 452 that are depicted in FIG. 4. Further, the software applications that can be operated and/or executed by the computing device 500 can include native applications, web services, and/or web-based applications.

The one or more location devices 532 can include one or more devices or circuitry for determining the position of the computing device 500. For example, the one or more location devices 532 can determine an actual and/or relative position of the computing device 500 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 6:
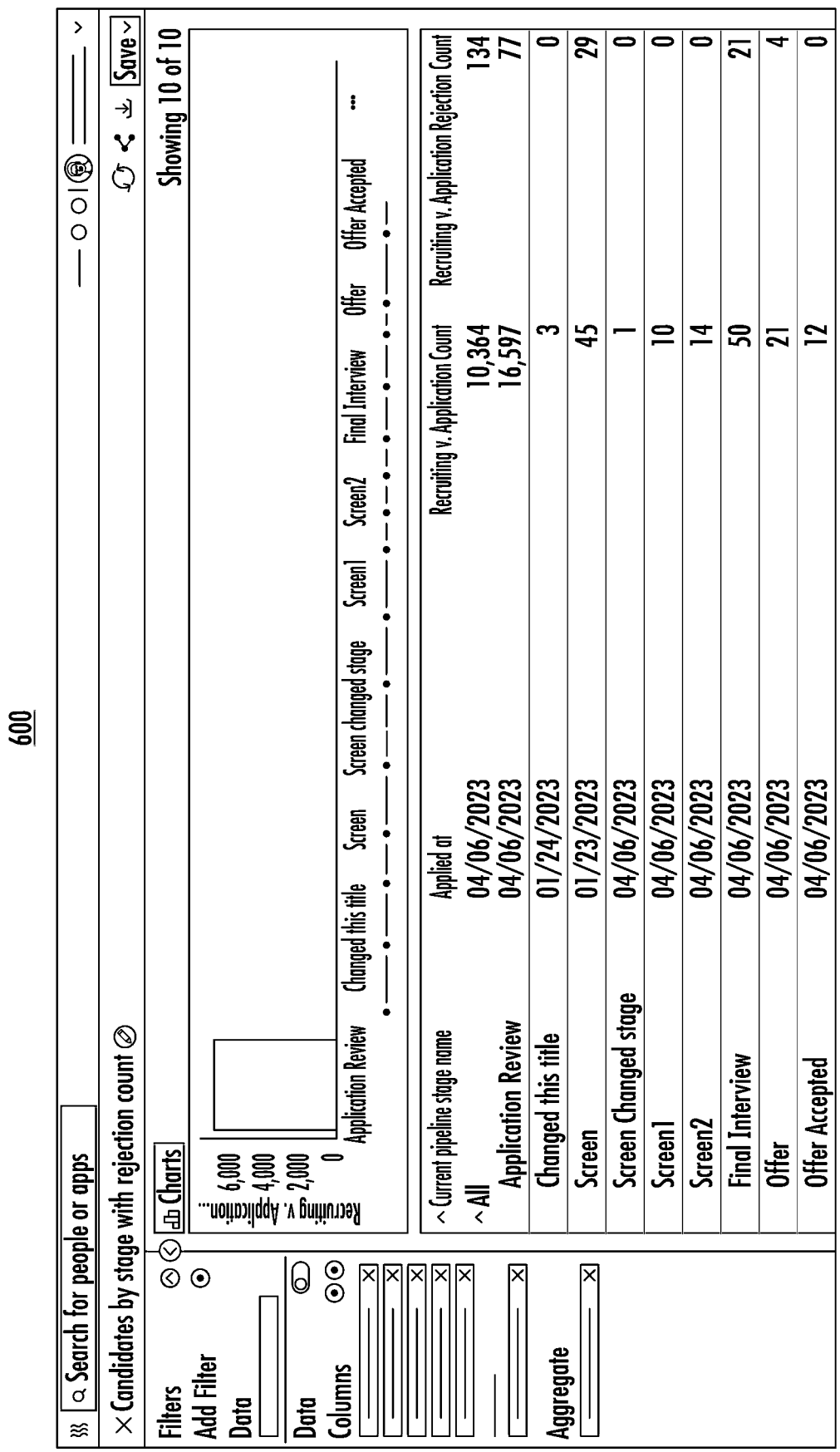
FIG. 6 depicts an illustration of a graphical user interface, according to example embodiments of the present disclosure.

FIG. 6 illustrates a graphical user interface 600 presenting symmetric aggregation and rollup report. In this example, the report is grouped by work location and employee department and shows aggregated values for salary and net pay during a three-month period. The system can compute rollup rows which show the super-aggregate values for the aggregated columns, such as the "All" row above which shows the aggregated values across all locations and departments and the "San Francisco" row which shows aggregated values across all departments within the San Francisco location.

When performing aggregations on one-to-many joined datasets, there needs to be careful handling to prevent counting the same value multiple times towards the aggregation.

For example, to generate a report that presents the average salary and the total pay per department over the last month, the system can join the employee data with pay-run data, which can look like the following:

| Department | Employee | Salary | Paydate | Pay |
|---|---|---|---|---|
| Engineering | A | 100 | 15th Jan. 2023 | 50 |
| Engineering | A | 100 | 31st Jan. 2023 | 50 |
| Engineering | B | 200 | 31st Jan. 2023 | 200 |
| Sales | C | 100 | 31st Jan. 2023 | 100 |

In this example, simply computing the average salary of Engineering in the above one-to-many joined dataset would give the answer as (100+100+200)/3=133.3. However, this is incorrect because the two of the '100' salaries belong to the same employee A. Hence, the correct average salary of Engineering would be (100+200)/2=150. The system solved this problem using symmetric aggregation, wherein the system ensures that values duplicated due to one-to-many joins count only once in the aggregated value.

The one-to-many join multiple counting problem applies to rollup aggregates as well, hence the system can apply the symmetric aggregation approach to rollups.

To perform symmetric aggregation on a field, the system utilizes the identifier (ID) field of that field's model to uniquely identify each value to be aggregated in the post-join dataset. In the above example, while aggregating Salary, we use the Employee as a unique identifier to arrive at the following unique Salary values to be aggregated—(A,100), (B, 200), (C, 100), thus allowing us to compute the overall average salary as (100+200+100)/3=133.3.

An example translation of this query into a SQL query is shown below:

```
SELECT
  Employee.department as department,
    (
      CAST(
        SUM(
          DISTINCT(
            CAST(from_base(substr(to_hex(md5(CAST(Employee.id AS VARBINARY))), 1, 15), 16) AS DECIMAL(30, 6))
              + CAST(from_base(substr(to_hex(md5(CAST(Employee.id AS VARBINARY))), -15), 16) AS DECIMAL(30, 6))
                + CAST(FLOOR(COALESCE(Employee.salary, 0) * 1000000.0) AS DECIMAL(30, 6))
          )
        )
        - SUM(
          DISTINCT(
            CAST(from_base(substr(to_hex(md5(CAST(Employee.id AS VARBINARY))), 1, 15), 16) AS DECIMAL(30, 6))
              + CAST(from_base(substr(to_hex(md5(CAST(Employee.id AS VARBINARY))), -15), 16) AS DECIMAL(30, 6))
          )
        ) AS DECIMAL(30, 6)
      ) / CAST(1000000.0 AS DECIMAL(30, 6))
    ) / (COUNT(DISTINCT (Employee.id)) * 1.0) as average_salary
FROM
  Employee
LEFT JOIN
  Payrun
ON Employee.id = Payrun.employee
GROUP BY ROLLUP Employee.department
```

The system automatically generates these complex queries behind the scenes by figuring out the ID fields and one-to-many joins without a user requesting the report having to understand the details of the databases.

Additionally, the system can utilize various hashing algorithms to determine optimal performance and the probability of hash collisions with large datasets. The system can select the hashing algorithm that has minimal hash collision probability without significant performance overhead.

Figure 7:
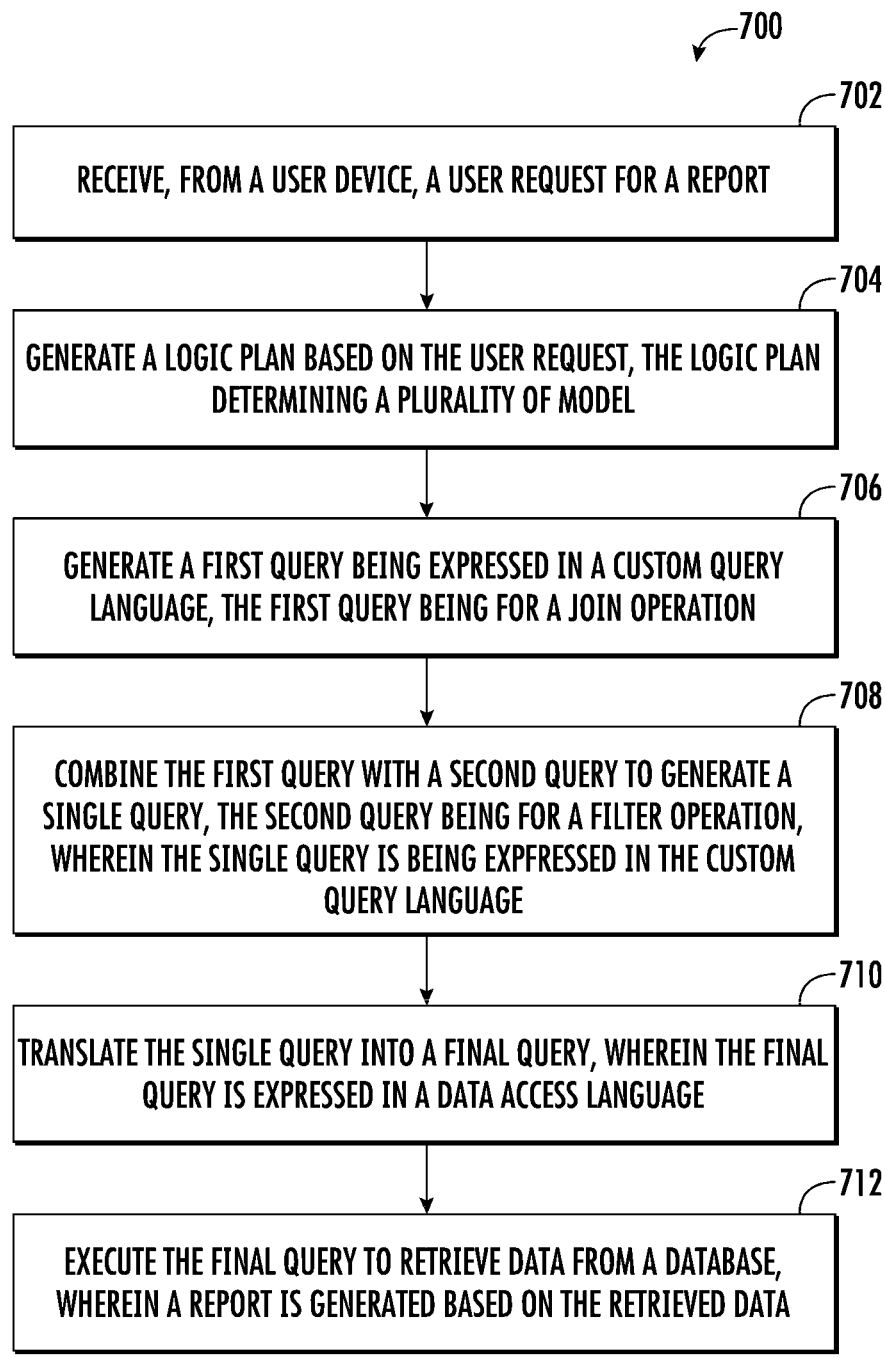
FIG. 7 depicts a flow diagram of an example method, according to example embodiments of the present disclosure.

FIG. 7 depicts a flow diagram of an example method 400 for performing multilayered generation and processing of computer instructions, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 702, a computer system can receive, from a user device, a user request for a report.

At 704, the computer system can generate a logic plan based on the user request. The logic plan can determine a plurality of models. In some instances, the logic plan determines the plurality of databases to obtain data for the report.

In some instances, the logic plan can be associated with a plurality of models. Additionally, the operations can include loading a query generator for the plurality of models.

At 706, the computer system can generate a first query being expressed in a custom query language, the first query being for a join operation.

At 708, the computer system can combine the first query with a second query to generate a unified query. The second query can be for a filter operation. Additionally, the unified query can be expressed in the custom query language.

In some instances, the system can aggregate the unified query from a first database of the plurality of databases with a new query from a second database of the plurality of databases to generate an aggregated query. Additionally, the final query can be further generated based on the aggregated query.

In some instances, the aggregated query can perform an aggregation on one-to-many joined datasets.

At 710, the computer system can translate the unified query into a final query. Additionally, the final query can be expressed in a data access language.

In some instances, the data access language is Structured query language (SQL).

At 712, the computer system can execute the final query to retrieve data from a database. Additionally, a report can be generated based on the retrieved data.

In some instances, the operations further include serializing the unified query to generate a serialized query. Additionally, the final query is further generated based on the serialized query.

In some instances, the system can aggregate the unified query from a first database of the plurality of databases with a new query from a second database of the plurality of databases to generate an aggregated query. The final query can be further generated based on the aggregated query.

In some instances, the system can retrieve data from a first database in the plurality of databases based on the user request. Additionally, the system can be retrieving data from a second database in the plurality of databases based on the new query.

In some instances, the system can generate permission filters for the first database in the plurality of databases based on user privileges of the user device.

In some instances, the aggregated query performs an aggregation on one-to-many joined datasets. For example, the aggregation can be performed using a first hashing algorithm. Additionally, the system can determine a minimal hash collision probability for each hash algorithm in a plurality of hash algorithms. Moreover, the system can select the first hashing algorithm from the plurality of hash algorithms. The first hash algorithm can have a minimal hash collision probability. For example, the first hash algorithm can be selected based on having the lowest hash collision probability.

In some instances, the system can serialize the unified query to generate a serialized query, wherein the final query is further generated based on the serialized query.

In some instances, the data access language can be Structured query language (SQL).

In some instances, the logic plan can be associated with a plurality of models. Additionally, the system can load a query generator for the plurality of models.

In some instances, the report can be a job report (e.g., job listing report) based on the organizational data of the organization.

In some instances, the system can determine that the final query is associated with data in a first database of the plurality of the database. Additionally, the system can retrieve the data in the first database based on the determination. Furthermore, the system can generate the report based on the retrieved data.

In some instances, the system can load data from a first database of the plurality of databases based on the user request. Additionally, the system can load data from a second database of the plurality of databases based on the user request. Moreover, the system can generate permission filters for the first database based on user privileges of the user device.

Numerous details are set forth in the foregoing description. However, it will be apparent to one of ordinary skills in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a unified device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer system that implements an organizational management platform that manages organizational data for an organization, the computer system comprising:
   one or more processors; and
   a plurality of databases that collectively store the organizational data associated with the organization, wherein the organizational data comprises an object graph data structure comprising a plurality of employee data objects that respectively correspond to a plurality of employees of the organization; and
   one or more non-transitory computer-readable media that collectively store instructions that, when executed by the one or more processors, cause the computer system to perform operations, the operations comprising:

receiving, from a user device, a user request for a report;

generating a logic plan based on the user request, the logic plan determining the plurality of databases to obtain data for the report;

generating, based on the logic plan, a first query being expressed in a custom query language, the first query being for a join operation;

combining the first query with a second query to generate a unified query, the second query being for a filter operation, wherein the unified query is being expressed in the custom query language;

aggregating the unified query from a first database of the plurality of databases with a new query from a second database of the plurality of databases to generate an aggregated query;

generating, based on the unified query and the aggregated query, a final query, wherein the final query is expressed in a data access language; and executing the final query to retrieve data from one or more databases in the plurality of databases, wherein the report is generated based on the data retrieved from the one or more databases.

2. The computer system of claim 1, the operations further comprising:

retrieving data from a first database in the plurality of databases based on the user request; and retrieving data from a second database in the plurality of databases based on the new query.

3. The computer system of claim 2, the operations further comprising:

generating permission filters for the first database in the plurality of databases based on user privileges of the user device.

4. The computing system of claim 1, wherein the aggregated query performs an aggregation on one-to-many joined datasets.

5. The computing system of claim 4, wherein the aggregation is performed using a first hashing algorithm.

6. The computing system of claim 5, the operations further comprising:

determining a minimal hash collision probability for each hash algorithm in a plurality of hash algorithm;

selecting the first hashing algorithm from the plurality of hash algorithm, the first hash algorithm having a minimal hash collision probability.

7. The computer system of claim 1, the operations further comprising:

serializing the unified query to generate a serialized query, wherein the final query is further generated based on the serialized query.

8. The computer system of claim 1, wherein the data access language is Structured query language (SQL).

9. The computer system of claim 1, wherein the logic plan is associated with a plurality of models, the operations further comprising:

loading a query generator for the plurality of models.

10. The computer system of claim 1, wherein the report is a job report based on the organizational data of the organization.

11. The computer system of claim 1, the operations further comprising:

determining that the final query is associated with data in a first database of the plurality of database;

retrieving the data in the first database based on the determination; and generating the report based on the retrieved data.

12. A computer-implemented method, comprising:

receiving, from a user device, a user request for a report;

generating a logic plan based on the user request, the logic plan determining a plurality of databases to obtain data for the report;

generating, based on the logic plan, a first query being expressed in a custom query language, the first query being for a join operation;

combining the first query with a second query to generate a unified query, the second query being for a filter operation, wherein the unified query is being expressed in the custom query language;

aggregating the unified query from a first database of the plurality of databases with a new query from a second database of the plurality of databases to generate an aggregated query;

generating, based on the unified query and the aggregated query, a final query, wherein the final query is expressed in a data access language; and executing the final query to retrieve data from a database, wherein the report is generated based on the data retrieved from the database.

13. The method of claim 12, wherein the aggregated query performs an aggregation on one-to-many joined datasets.

14. The method of claim 12, the method further comprising:

serializing the unified query to generate a serialized query, wherein the final query is further generated based on the serialized query.

15. The method of claim 12, wherein the data access language is Structured query language (SQL).

16. The method of claim 12, the method further comprising:

loading data from a first database in the plurality of database based on the user request; and loading data from a second database in the plurality of databases based on the user request.

17. The method of claim 16, the method further comprising:

generating permission filters for the first database in the plurality of databases based on user privileges of the user device.

18. One or more tangible non-transitory computer-readable media storing computer-readable instructions that, when executed by one or more processors, cause the one or more processors to:

receive, from a user device, a user request for a report;

generate a logic plan based on the user request, the logic plan determining a plurality of model;

generate a first query being expressed in a custom query language, the first query being for a join operation;

combine the first query with a second query to generate a unified query, the second query being for a filter operation, wherein the unified query is being expressed in the custom query language;

aggregating the unified query from a first database of the plurality of databases with a new query from a second database of the plurality of databases to generate an aggregated query;

translate the aggregated query into a final query, wherein the final query is expressed in a data access language; and execute the final query to retrieve data from a database, wherein the report is generated based on the data retrieved from the database.

* * * * *